United States Patent [19]

Redenbarger et al.

[11] Patent Number: 4,611,680
[45] Date of Patent: Sep. 16, 1986

[54] HOOD DOOR ASSEMBLY

[75] Inventors: Philip D. Redenbarger, Centerpoint; Franklin R. McCarty, West Terre Haute, both of Ind.

[73] Assignee: J. I. Case Company, Racine, Wis.

[21] Appl. No.: 771,453

[22] Filed: Aug. 30, 1985

[51] Int. Cl.⁴ .............................................. B62D 25/12
[52] U.S. Cl. ................................... 180/69.24; 16/346; 220/315; 220/335; 292/259 R; 292/338
[58] Field of Search .............. 16/346, 347; 296/24 R, 296/24 A, 56; 220/315, 335; 292/218, 259, 338; 180/69.2, 69.21, 69.24

[56] References Cited

U.S. PATENT DOCUMENTS

| | | | |
|---|---|---|---|
| 3,225,856 | 12/1965 | Caramanna | 220/335 X |
| 3,743,045 | 7/1973 | Hansen | 180/69.24 |
| 4,415,052 | 11/1983 | Gauer | 180/69.2 |
| 4,429,911 | 2/1984 | O'Neal et al. | 292/259 R |
| 4,458,774 | 7/1984 | Sieren | 180/69.2 |

Primary Examiner—John J. Love
Assistant Examiner—Michael Mar
Attorney, Agent, or Firm—Cullen, Sloman, Cantor, Grauer, Scott & Rutherford

[57] ABSTRACT

A hood door assembly including a first door which swings about a generally horizontally disposed axis and a second door which swings about a generally vertical axis for providing access to an engine compartment for servicing of an engine. A rod is provided for holding the first door both in its open and closed positions. One end of the rod is pivotally attached to the hood while a free end of the rod is engageable within a slot in a retainer plate when the first door is closed. The rod includes a bent handle portion adjacent its free end which is rotated for engaging or releasing the free end of the rod within the retainer plate slot when the first door is closed. Further, when the first door is swung open about its generally horizontal axis, the free end of the rod is inserted through an opening in a bracket on the first door such that the bent handle portion engages the bracket for supporting the first door in an open position. When the first door is closed, the rod is swung into sliding engagement with the retainer plate slot such that a mid-portion of the rod is deflected against the first door bracket thereby resulting in spring tension against the bracket for holding the first door closed.

5 Claims, 6 Drawing Figures

HOOD DOOR ASSEMBLY

BACKGROUND OF THE INVENTION

The present invention relates to a hood assembly and more particularly to hinged hood doors which provide improved access to an engine compartment for servicing an engine.

A conventional articulated front end loader comprises front and rear wheeled units interconnected by at least one vertical pivot for forming an articulating joint between the units. An engine is typically mounted on the rear unit for powering the loader. It is common for the engine to be surrounded by a hood or cover which includes an access door for permitting servicing of the engine. A problem with known access doors is that they are cumbersome to use or operate and fail to provide adequate access to the engine compartment.

Thus, an object of the present invention is to provide improved access to the engine compartment by means of a hood assembly which is simplified in construction to permit easy use.

SUMMARY OF THE INVENTION

The hood door assembly of the present invention is disclosed in connection with an articulated front end loader including front and rear wheeled units with the front unit being provided with a boom assembly for operating a bucket and the rear unit being provided with an engine. The engine is enclosed or surrounded by a hood cover, and therefore, the present invention relates to a door assembly which permits access to the engine for servicing.

The hood door assembly of the present invention includes a first door which is attached to the hood by a generally horizontal hinge and a second door which is attached to the hood by a vertically disposed hinge. A rod is provided for holding the first hood door in both its open and closed positions. One end of the rod is pivotally attached to the hood by a ball joint member and a free end of the rod is engageable within a slot in a retainer plate when the first door is closed. The rod includes a bent handle portion adjacent its free end. The handle portion is rotated for engaging or releasing the free end of the rod within the retainer plate slot when the first door is closed. Further, when the first door is swung open, the free end of the rod is inserted through an opening in a door bracket such that the bent handle portion engages the underside of the bracket for supporting the first door in an open position.

The hood doors swing from generally vertical closed positions to open positions with the first door swinging upwardly and the second door swinging outwardly. This permits considerable access to the engine which is enclosed or surrounded by the hood. Further, the rod acts both as a support or prop for the first door when it is in its open position, and acts as a latch for the first door when it is closed.

When the hood doors are open and it is desired to close them, the first door is released by disengaging the free end of the rod from the first door bracket opening, thereby allowing the first door to swing to a closed vertical position. After the first door is hanging in a vertical closed position, the free end of the rod is swung into sliding engagement with the retainer plate slot such that a mid-portion of the rod is deflected against the first door bracket. The bent rod handle is then rotated for causing the free end of the rod to snap into an offset end of the retainer plate slot thereby latching the rod in place. Thus, when the free end of the rod is inserted within the retainer plate slot, its mid-portion bears against the first door bracket for latching the first door in a closed position due to the deflection of the rod and resulting spring tension on the door bracket. After the first door is secured closed, the second door is swung closed and latched by utilizing a conventional catch.

The hood doors are opened from a closed position by first releasing the catch on the second door and then swinging the second door outwardly about its vertical hinge to an open position. The bent rod handle is rotated thereby releasing the free end of the rod from the retainer plate slot. The first hood door is then swung upwardly about its generally horizontally disposed hinge to an open position and the rod is pivoted about its ball joint and the free end of the rod is inserted through the first door bracket opening such that the rod supports the first door in an open position.

Thus, the hood door assembly of the present invention is constructed for ease of manufacture and use. The support rod functions not only as a support or prop, but also as a latch for the first door when it is in the closed position. This construction reduces the cost of the assembly by eliminating the need for separate latches and reduces the number of elements needed for the assembly. Further, the spring tension latching feature eliminates the necessity for close manufacturing tolerances between the hood and doors.

Other advantages and meritorious features of the hood door assembly will be more fully understood from the following description of the invention, the appended claims, and the drawings, a brief description of which follows.

DETAILED DESCRIPTION OF THE INVENTION

Figure 1:
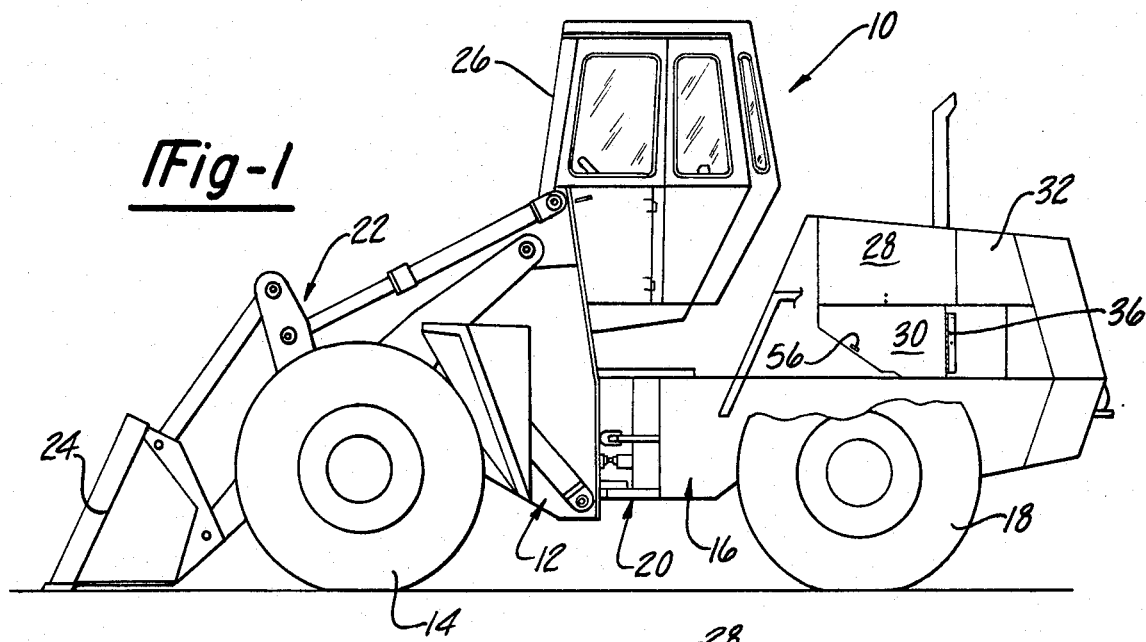
FIG. 1 is a side elevational view of a front end loader having the hood door assembly of the present invention.

Referring to FIG. 1, an articulated front end loader 10 is shown. The articulated loader 10 comprises a forward unit 12 supported on wheels 14 and a rear unit 16 supported on wheels 18. The forward and rear units 12 and 16 are interconnected by vertically spaced bearing assemblies, generally shown as 20, which form an articulating joint between the two units. The forward unit 12 of the loader is provided with a boom assembly 22 for supporting and operating a bucket 24. An operator's cab 26 is mounted on the forward unit above the articulating bearing assemblies 20.

Figure 2:
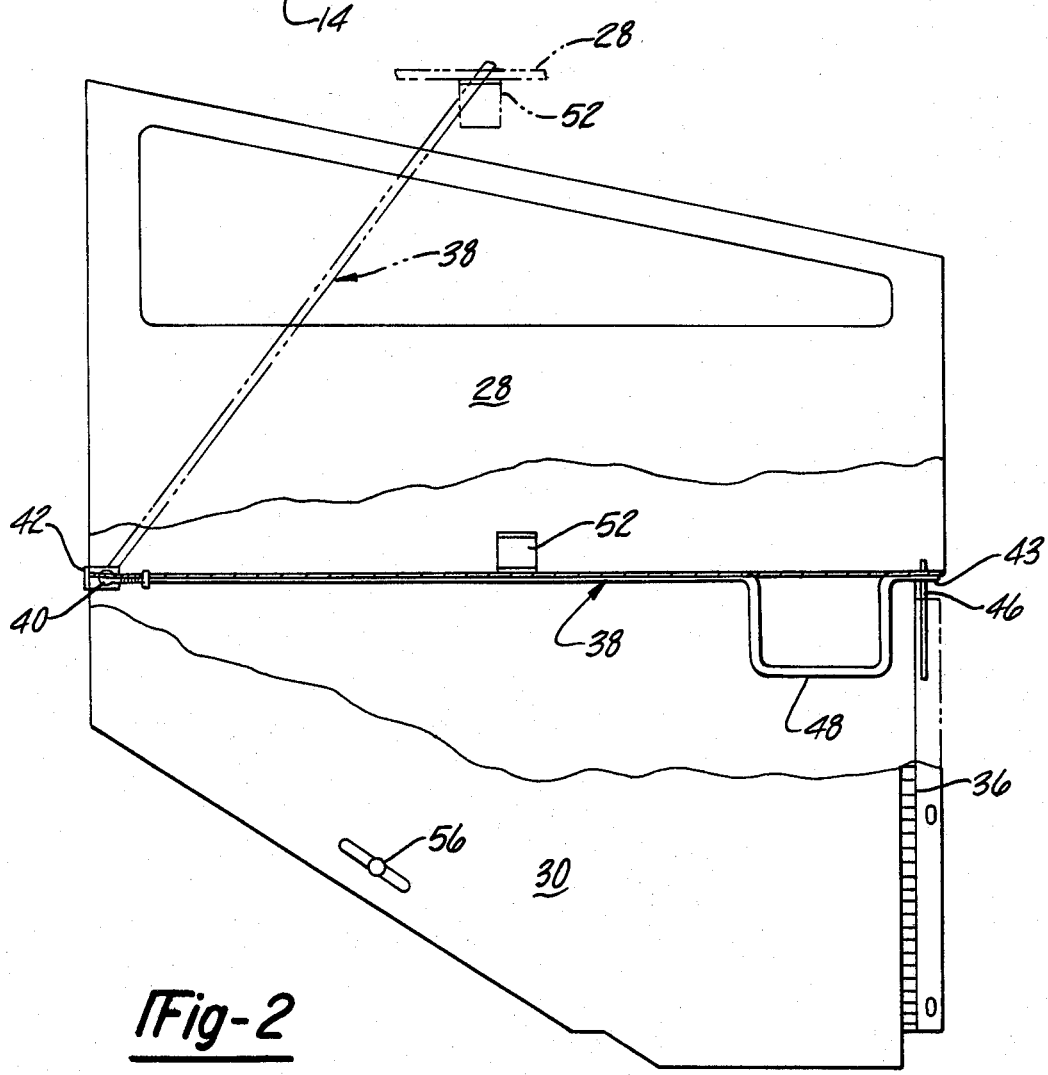
FIG. 2 is a side elevational view of the hood door assembly illustrating the movement of the support rod.
Figure 4:
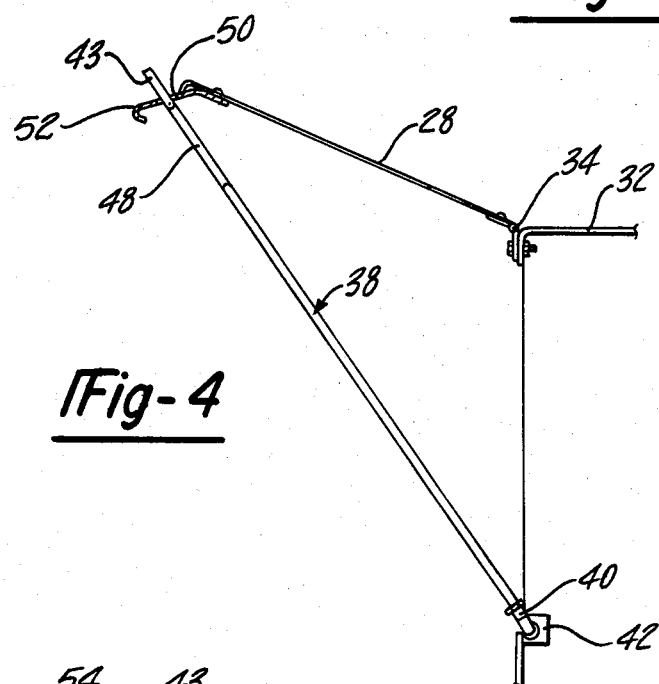
FIG. 4 is an end view illustrating the first hood door in its open position.

Referring to FIGS. 1 and 2, the rear unit is provided with hinged hood doors 28 and 30 to permit access to the engine (not shown) which is mounted on the rear unit. Hood door 28 is attached to the metal hood or cover 32 surrounding the engine (not shown) by a generally horizontally disposed hinge 34 (FIG. 4). Further, the other hood door 30 is attached to hood cover 32 by a vertically disposed hinge 36.

A rod 38 is provided for holding hood door 28 both in its open and closed positions as shown in FIGS. 2-5. One end of rod 38 is pivotally attached to cover 32 by a ball joint member 40 which is mounted to bracket 42. The other or free end 43 of rod 38 is engageable within a slot 44 in retainer plate 46 when door 28 is closed. Rod 38 includes a bent handle portion 48 adjacent its free end 43. Handle portion 48 is rotated for engaging or releasing the end 43 of rod 38 within slot 44. Further, when hood 28 is propped open as shown in FIG. 4, the free end 43 of rod 38 is inserted through opening 50 in door bracket 52 such that the bent handle portion 48 engages the underside of bracket 52 for supporting door 28 in an open position.

Figure 3:
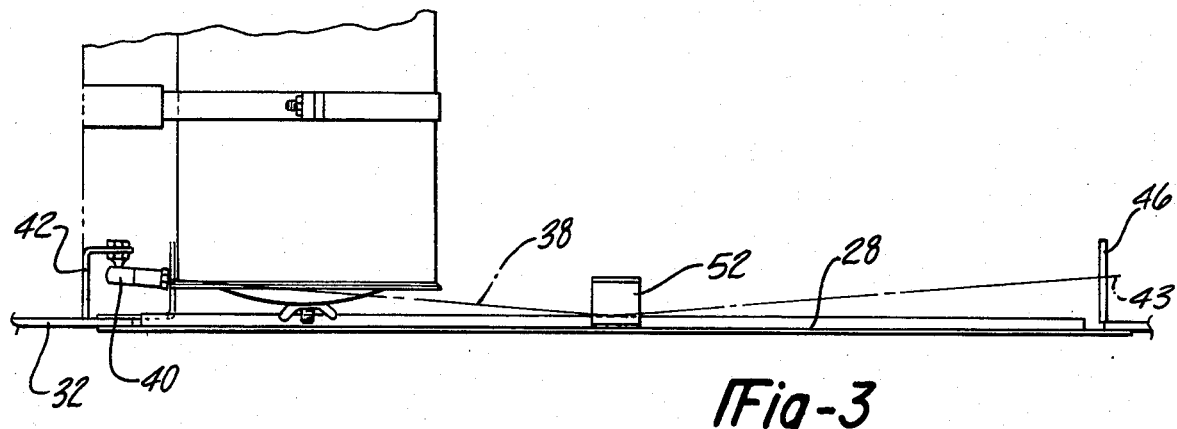
FIG. 3 is a top view of the assembly illustrating the spring tension latching between the support rod and door bracket.

Improved access to the engine (not shown) is provided with the hood door assembly of the present invention which includes rod 38, retainer 46, bracket 52 and hinged doors 28, 30. Hood doors 28 and 30 swing from generally vertical closed positions as shown in FIG. 1 to open positions with the first door 28 swinging upwardly about its generally horizontally disposed hinge 34 (FIG. 4) and with the second door 30 swinging outwardly about its vertically disposed hinge 36. This permits considerable access to the space enclosed by hood cover 32. Further, rod 38 acts both as a support or prop for door 28 when it is in its open position (FIG. 4) and as a latch for door 28 when it is closed (FIG. 3).

Figure 5:
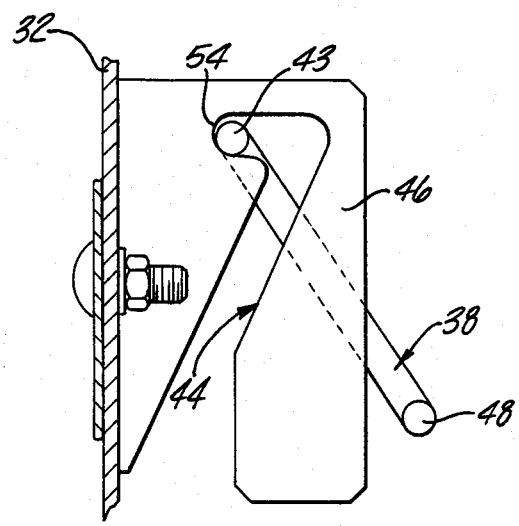
FIG. 5 is a side elevational view of the retainer plate and support rod connection.
Figure 6:
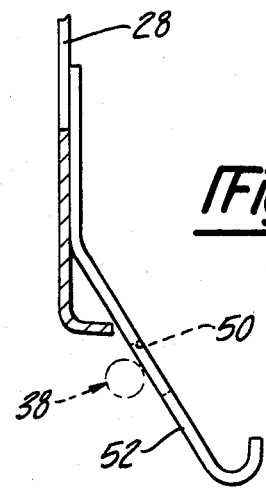
FIG. 6 is a detail view of the first door bracket illustrating the engagement between the support rod and bracket when the first door is closed.

When doors 28 and 30 are open and it is desired to close them, the first step is to release rod 38 by disengaging its free end 43 from bracket opening 50 (FIG. 4), thereby allowing door 28 to swing to a closed position. After door 28 is hanging in a vertical closed position, the free end 43 of rod 38 is swung into sliding engagement with retainer plate slot 44 such that a mid-portion of rod 38 is deflected against bracket 52 as shown in phantom lines in FIGS. 3 and 6. Rod handle 48 is rotated for causing the free end 43 of rod 38 to snap into the offset end 54 of slot 44 (FIG. 5). Thus, when the free end 43 of rod 38 is inserted within slot 44, its mid-portion bears against the door bracket 52 for latching first hood door 28 in a closed position due to the deflection of rod 38 and resulting spring tension on bracket 52. After door 28 is secured, door 30 is swung closed and latched by utilizing a conventional catch 56 on door 30.

Doors 28 and 30 are opened from a closed position by first releasing catch 56 and then swinging door 30 outwardly to an open position. Next, rod handle 48 is rotated thereby releasing the free end 43 of rod 38 from slot end 54. Door 28 is swung upwardly to an open position and rod 38 is pivoted about its ball joint 40 whereby the free end of rod 38 is inserted through bracket opening 50 such that rod 38 supports door 28 in an open position.

It will be apparent to those skilled in the art that the foregoing disclosure is exemplary in nature, rather than limiting, the invention being limited only by the appended claims.

We claim:

1. In a vehicle having a cover for enclosing an engine, the improvement comprising:

a door assembly including a first door and a second door;

means for mounting said first door to said cover for permitting swinging pivotal movement of said first door about a first axis and means for mounting said second door to said cover for permitting swinging pivotal movement of said second door about a second axis, said first axis being generally perpendicular to said second axis, said first and second doors being swingable between closed and open positions, and said doors lying in substantially the same plane in their closed positions with the bottom of said first door being proximate the top of said second door;

rod means for securing said first door in its open and closed positions, one end of said rod means being pivotally attached to said cover and the other end of said rod means engaging a retainer means on said cover when said first door is in its closed position, said other end of said rod means engaging bracket means on said first door for supporting said first door in its open position, and said rod means engaging said bracket means for holding said first door in its closed position when said other end of said rod means is engaging said retainer means.

2. The door assembly for a vehicle as defined in claim 1 wherein said rod means has a bent handle portion adjacent its other end and said bracket means including an opening, said other end of said rod means being insertable into said opening when said first door is swung to its open position with said bent handle portion engaging said bracket means for supporting said first door in its open position.

3. The door assembly for a vehicle as defined in claim 1 wherein the other end of said rod means being engageable within a slot in said retainer means when said first door is in its closed position such that a mid-portion of said rod bears against said bracket means for latching said first door in its closed position.

4. The door assembly for a vehicle as defined in claim 3 wherein said rod means has a bent handle portion which is rotatable for engaging and disengaging said other end of said rod means within the slot of said retainer means.

5. The door assembly for a vehicle as defined in claim 1 wherein said second door overlying said rod means when said first door is in its closed position.

* * * * *